United States Patent
Liu et al.

(10) Patent No.: US 10,684,834 B2
(45) Date of Patent: Jun. 16, 2020

(54) METHOD AND APPARATUS FOR DETECTING INTER-INSTRUCTION DATA DEPENDENCY

(71) Applicant: HUAWEI TECHNOLOGIES CO., LTD., Shenzhen, Guangdong (CN)

(72) Inventors: Hongyuan Liu, Hong Kong (CN); Cho-Li Wang, Hong Kong (CN); KingTin Lam, Hong Kong (CN); Huanxin Lin, Hong Kong (CN); Bin Zhang, Hangzhou (CN); Junchao Ma, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/360,951

(22) Filed: Mar. 21, 2019

(65) Prior Publication Data

US 2019/0220257 A1 Jul. 18, 2019

Related U.S. Application Data

(63) Continuation of application No. PCT/CN2017/103056, filed on Sep. 23, 2017.

(30) Foreign Application Priority Data

Oct. 31, 2016 (CN) .......................... 2016 1 0931621

(51) Int. Cl.
 *G06F 8/41* (2018.01)
 *G06F 16/00* (2019.01)
(52) U.S. Cl.
 CPC .............. *G06F 8/445* (2013.01); *G06F 8/456* (2013.01); *G06F 16/00* (2019.01)

(58) Field of Classification Search
 None
 See application file for complete search history.

(56) References Cited

U.S. PATENT DOCUMENTS 8,549,499 B1 * 10/2013 Ding ..................... G06F 8/456
 712/216
9,921,839 B1 * 3/2018 Subramanian ........ G06F 9/3009
(Continued)

FOREIGN PATENT DOCUMENTS

CN 1444154 A 9/2003
CN 102508689 A 6/2012
(Continued)

OTHER PUBLICATIONS

Hongyuan Liu et al. Lightweight Dependency Checking for Parallelizing Loops with Non-deterministic Dependency on GPU, 2016 IEEE 22nd International Conference on Parallel and Distributed Systems. 2016. pp. 884-893.

*Primary Examiner* — Philip Wang
(74) *Attorney, Agent, or Firm* — Womble Bond Dickinson (US) LLP

(57) ABSTRACT

Embodiments of the present invention disclose a method and an apparatus for detecting inter-instruction data dependency. The method comprises: comparing a thread number corresponding to a historical access operation with a thread number corresponding to a write access operation, if the thread number corresponding to the write access operation is less than the thread number corresponding to the historical access operation, which indicates existence of data dependency for a to-be-detected instruction, terminating the detection; or comparing a thread number corresponding to a historical write access operation with a thread number corresponding to a read access operation, if the thread number corresponding to the read access operation is less than the thread number corresponding to the historical write (Continued)

access operation, which indicates existence of data dependency for the to-be-detected instruction, terminating the detection.

15 Claims, 6 Drawing Sheets

(56) References Cited

U.S. PATENT DOCUMENTS

| | | |
|---|---|---|
| 2002/0052856 A1 | 5/2002 | Satoh |
| 2003/0177288 A1 | 9/2003 | Kunimatsu et al. |
| 2011/0067014 A1* | 3/2011 | Song ................ G06F 8/456 |
| | | 717/149 |
| 2011/0161642 A1* | 6/2011 | Eichenberger ...... G06F 9/30076 |
| | | 712/241 |
| 2012/0191949 A1* | 7/2012 | Gonion ............. G06F 9/30036 |
| | | 712/208 |
| 2013/0113809 A1* | 5/2013 | Kong ................ G06F 8/443 |
| | | 345/505 |
| 2016/0357529 A1* | 12/2016 | Tsujimori ............ G06F 8/452 |
| 2018/0157471 A1* | 6/2018 | Venkataramani ...... G06F 8/445 |

FOREIGN PATENT DOCUMENTS

| | | |
|---|---|---|
| CN | 103793653 A | 5/2014 |
| EP | 3001312 A1 | 3/2016 |

\* cited by examiner

When a detection thread performs an access operation on a variable, a processor detects whether there is a historical access operation on the variable, and if there is no historical access operation on the variable, records an access type and a thread number corresponding to the current access operation    S202

When there is a historical access operation on the variable, if the access type of the current access operation is a write operation, the processor compares a thread number corresponding to the historical access operation with the thread number corresponding to the current access operation, and if the thread number corresponding to the current access operation is less than the thread number corresponding to the historical access operation, which indicates presence of data dependency for a to-be-detected instruction, terminates detection; and if the access type of the current access operation is a read operation and the historical access operation includes a historical write access operation, compares a thread number corresponding to the historical write access operation with the thread number corresponding to the current access operation, and if the thread number corresponding to the current access operation is less than the thread number corresponding to the historical write access operation, which indicates presence of data dependency for the to-be-detected instruction, terminates the detection    S204

FIG. 2

METHOD AND APPARATUS FOR DETECTING INTER-INSTRUCTION DATA DEPENDENCY

CROSS-REFERENCE TO RELATED APPLICATION

This application is a continuation of International Application No. PCT/CN2017/103056, filed on Sep. 23, 2017, which claims priority to Chinese Patent Application No. 201610931621.0, filed on Oct. 31, 2016. The disclosures of the aforementioned applications are hereby incorporated by reference in their entireties.

TECHNICAL FIELD

This application relates to the computer field, and in particular, to a method and an apparatus for detecting inter-instruction data dependency.

BACKGROUND

In recent years, many-core computing has been applied not only to high-performance computing, but also to mobile devices and personal computers. The many-core computing technology represented by a graphics processing unit (GPU) has also been applied everywhere. However, use of a heterogeneous many-core processor to accelerate an existing program remains a challenging task. Because looping in a serial program usually consumes a relatively large proportion of execution time, loop parallelization is a solution that uses a many-core accelerator to accelerate an existing program. In the loop parallelization solution, a polyhedron model is a powerful scheme covering loop analysis, loop transformation, and a many-core processor, and polyhedron-model-based compilers also emerge endlessly. However, the polyhedron model allows to merely analyze loops of an affine function in an iteration domain and a data domain, and a large proportion of non-affine dynamic loops in the iteration domain or the data domain still exist in a variety of existing programs. Because such loops may have indefinite data dependency during compilation, the loops are difficult to parallelize by using the polyhedral model or another static approach.

However, determining inter-iteration data dependency during running may consume a lot of extra time and space. As a result, a relatively good acceleration ratio cannot be obtained when an entire loop is executed on the GPU, and even the entire loop cannot be executed on the GPU with a scarce memory due to excessive space required. Therefore, designing a light-weight runtime inter-iteration dependency detection technology is a key to parallelize loops with indefinite data dependency during compilation.

SUMMARY

In view of this, embodiments of the present invention disclose a method and an apparatus for detecting inter-instruction data dependency, so as to implement non-affine data dependency detection by comparing access operation information with historical access operation information.

According to a first aspect, this application provides a method for detecting inter-instruction data dependency, where a set of to-be-detected instructions includes at least two instructions that need to be cyclically executed for N rounds, N detection threads running on a processor perform parallel detection on the N rounds of cyclical executions respectively, thread numbers from the $1^{st}$ detection thread to the $N^{th}$ detection thread are increased, an $i^{th}$ detection thread is used to detect an $i^{th}$ round of cyclical execution where N is a positive integer greater than 1, and i is a positive integer greater than 0 and less than or equal to N; and the method includes: when a detection thread performs an access operation on a variable, detecting whether there is a historical access operation on the variable, and if there is no historical access operation on the variable, recording a thread number corresponding to the current access operation; and when there is a historical access operation on the variable, if an access type of the current access operation is a write operation, comparing a thread number corresponding to the historical access operation with the thread number corresponding to the current access operation, and if the thread number corresponding to the current access operation is less than the thread number corresponding to the historical access operation, which indicates existence of data dependency for a to-be-detected instruction, terminating the detection, and if the access type of the current access operation is a read operation and the historical access operation includes a historical write access operation, comparing a thread number corresponding to the historical write access operation with the thread number corresponding to the current access operation, and if the thread number corresponding to the current access operation is less than the thread number corresponding to the historical write access operation, which indicates existence of data dependency for the to-be-detected instruction, terminating the detection.

Specifically, the historical access operation includes the historical write access operation and a historical read access operation. The system separately records the historical write access operation on the variable and the historical read access operation on the variable. For example, the thread number corresponding to the historical write access operation on the variable and a thread number corresponding to the historical read access operation on the variable may be separately recorded by using one storage space. For ease of description, a storage space used for recording the thread number corresponding to the historical read access operation on the variable is denoted as an R space, and a storage space used for recording the thread number corresponding to the historical write access operation on the variable is denoted as a W space. If there is no historical read access operation on the variable, the R space is a specific identifier. If there is no historical write access operation on the variable, the W space is a specific identifier.

Recording the thread number corresponding to the current access operation may be specifically: if the current access operation is a write operation, recording the thread number corresponding to the current access operation in the W space; and if the current access operation is a read operation, recording the thread number corresponding to the current access operation in the R space.

In one embodiment, the method further includes: if the access type of the current access operation is a write operation, when the thread number corresponding to the current access operation is greater than the thread number corresponding to the historical write access operation or the historical access operation includes no historical write access operation, recording the thread number corresponding to the current access operation.

Because only a historical write access operation with a largest thread number needs to be compared in a detection process, if there is a historical write access operation, the thread number corresponding to the current access operation is recorded only when the thread number corresponding to the current access operation is greater than the thread number corresponding to the historical write access operation. If the thread number corresponding to the current access operation is equal to the thread number corresponding to the historical write access operation, the historical write access operation that is recorded does not need to be updated, so as to avoid an additional update operation.

In one embodiment, the method further includes: if the access type of the current access operation is a write operation, when the thread number corresponding to the current access operation is not less than the thread number corresponding to the historical write access operation or the historical access operation includes no historical write access operation, recording the thread number corresponding to the current access operation.

Based on a determining result in the first aspect, if there is a historical write access operation, as long as the thread number corresponding to the current access operation is not less than the thread number corresponding to the historical write access operation, the historical write access operation is updated, that is, the thread number corresponding to the current access operation is recorded, so as to reduce complexity of an algorithm. However, an update operation is also performed when the thread number corresponding to the current access operation is equal to the thread number corresponding to the historical write access operation.

In one embodiment, when the thread number corresponding to the access operation needs to be recorded, if the historical access operation includes a historical write access operation, the method further includes: deleting the thread number corresponding to the historical write access operation.

Because only a thread number needs to be recorded for the historical write access operation with the largest thread number, the thread number corresponding to the historical write access operation may be deleted when the thread number corresponding to the current access operation is recorded. To be specific, the thread number corresponding to the current access operation is recorded in a manner of updating the W space.

In one embodiment, the method further includes: if the access type of the current access operation is a read operation, when the thread number corresponding to the current access operation is greater than the thread number corresponding to the historical access operation, recording the thread number corresponding to the current access operation.

If the current access operation is a read operation, only a historical read access operation that has a largest thread number and whose thread number is greater than the largest thread number corresponding to the historical write access operation needs to be recorded because there is no data dependency between read operations. Therefore, the thread number corresponding to the current access operation needs to be recorded only when the thread number corresponding to the current access operation is greater than the thread number corresponding to the historical access operation.

In one embodiment, the method further includes: if the access type of the current access operation is a read operation, when the thread number corresponding to the current access operation is greater than a thread number corresponding to the historical read access operation, recording the thread number corresponding to the current access operation.

In one embodiment, when the thread number corresponding to the access operation needs to be recorded, if the historical access operation includes the historical read access operation, the method further includes: deleting the thread number corresponding to the historical read access operation.

To be specific, the thread number corresponding to the current access operation is recorded in a manner of updating the R space, so as to save a storage space.

According to a second aspect, this application provides a readable medium, including an execution instruction. When a processor of a computing device executes the execution instruction, the computing device performs the method according to any one of the first aspect or the possible implementations of the first aspect.

According to a third aspect, this application provides a computing device, including: a processor, a memory, and a bus, where the memory is configured to store an execution instruction, the processor is connected to the memory by using the bus, and when the computing device runs, the processor executes the execution instruction stored in the memory, so that the computing device performs the method according to any one of the first aspect or the possible implementations of the first aspect.

According to a fourth aspect, this application provides an apparatus for detecting inter-instruction data dependency, where a set of to-be-detected instructions includes at least two instructions that need to be cyclically executed for N rounds, N detection threads running on a processor perform parallel detection on the N rounds of cyclical executions respectively, and the at least two instructions are sequentially detected according to an instruction sequence, thread numbers from the $1^{st}$ detection thread to the $N^{th}$ detection thread are increased, an $i^{th}$ detection thread is used to detect an $i^{th}$ round of cyclical execution, where N is a positive integer greater than 1, and i is a positive integer greater than 0 and less than or equal to N; and the apparatus includes: a detection unit, configured to, when a detection thread performs an access operation on a variable, detect whether there is a historical access operation on the variable; a recording unit, configured to record a thread number corresponding to the current access operation when there is no historical access operation on the variable; and a comparing unit, configured to: when there is a historical access operation on the variable, if an access type of the current access operation is a write operation, compare a thread number corresponding to the historical access operation with the thread number corresponding to the current access operation, and if the thread number corresponding to the current access operation is less than the thread number corresponding to the historical access operation, which indicates existence of data dependency for a to-be-detected instruction, terminate detection; and configured to: if the access type of the current access operation is a read operation and the historical access operation includes a historical write access operation, compare a thread number corresponding to the historical write access operation with the thread number corresponding to the current access operation, and if the thread number corresponding to the current access operation is less than the thread number corresponding to the historical write access operation, which indicates existence of data dependency for the to-be-detected instruction, terminate the detection.

In one embodiment, if the access type of the current access operation is a write operation, when the thread number corresponding to the current access operation is greater than the thread number corresponding to the historical write access operation or the historical access operation includes no historical write access operation, the recording unit is configured to record the thread number corresponding to the current access operation.

In one embodiment, the apparatus further includes a deletion unit, where when the recording unit records the thread number corresponding to the access operation, and if the historical access operation includes the historical write access operation, the deletion unit is configured to delete the thread number corresponding to the historical write access operation.

In one embodiment, if the access type of the access operation is a read operation, when the thread number corresponding to the access operation is greater than the thread number corresponding to the historical access operation, the recording unit is configured to record the thread number corresponding to the access operation.

In one embodiment, the apparatus further includes a deletion unit, where when the recording unit records the thread number corresponding to the access operation, and if the historical access operation includes a historical read access operation, the deletion unit is configured to delete a thread number corresponding to the historical read access operation.

The fourth aspect is an apparatus implementation corresponding to the method in the first aspect. Descriptions in any one of the first aspect or the possible implementations of the first aspect are correspondingly applicable to any one of the fourth aspect or the possible implementations of the fourth aspect, and details are not described herein again.

According to the technical solutions disclosed in the embodiments of the present invention, the access operation on the variable is monitored and whether there is data dependency between instructions of a set of to-be-detected instructions can be detected. A detection procedure in the embodiments of the present invention simulates an actual execution procedure of parallel execution of the to-be-detected instruction set, and therefore affine data dependency and non-affine data dependency can be detected. In this way, an instruction set without data dependency is identified to a greatest extent, and a determined instruction set without data dependency is executed in parallel on a GPU, so as to accelerate execution of the instruction set and improve overall performance of a system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive another drawing from these accompanying drawings without creative efforts.

FIG. 2 is an exemplary flowchart of a method for detecting inter-instruction data dependency according to an embodiment of the present invention;

DESCRIPTION OF EMBODIMENTS

In the embodiments of the present invention, information of an access operation on a variable is compared with information of a historical access operation on the same variable, to detect data dependency of a to-be-detected instruction, and in particular, to detect non-affine data dependency between instructions. In a heterogeneous computing system, detected loop instructions without data dependency may be executed in parallel by a graphics processing unit (GPU). This improves overall performance of the system. According to embodiments of the present invention, an indefinite dependency relationship during compilation can be quickly determined by using a lightweight data dependency detection technology, so as to determine whether an execution is to be performed by the GPU.

It should be understood that, although the embodiments of the present invention are described by using a scenario of the heterogeneous computing system, the embodiments of the present invention are not limited to a specific usage scenario. The embodiments of the present invention may be applied to any computer system, any computing device, and so on.

In the embodiments of the present invention, the indefinite data dependency relationship during compilation can be detected, and a determined instruction without data dependency can still be executed by the GPU. This improves overall performance of the system.

Figure 1:
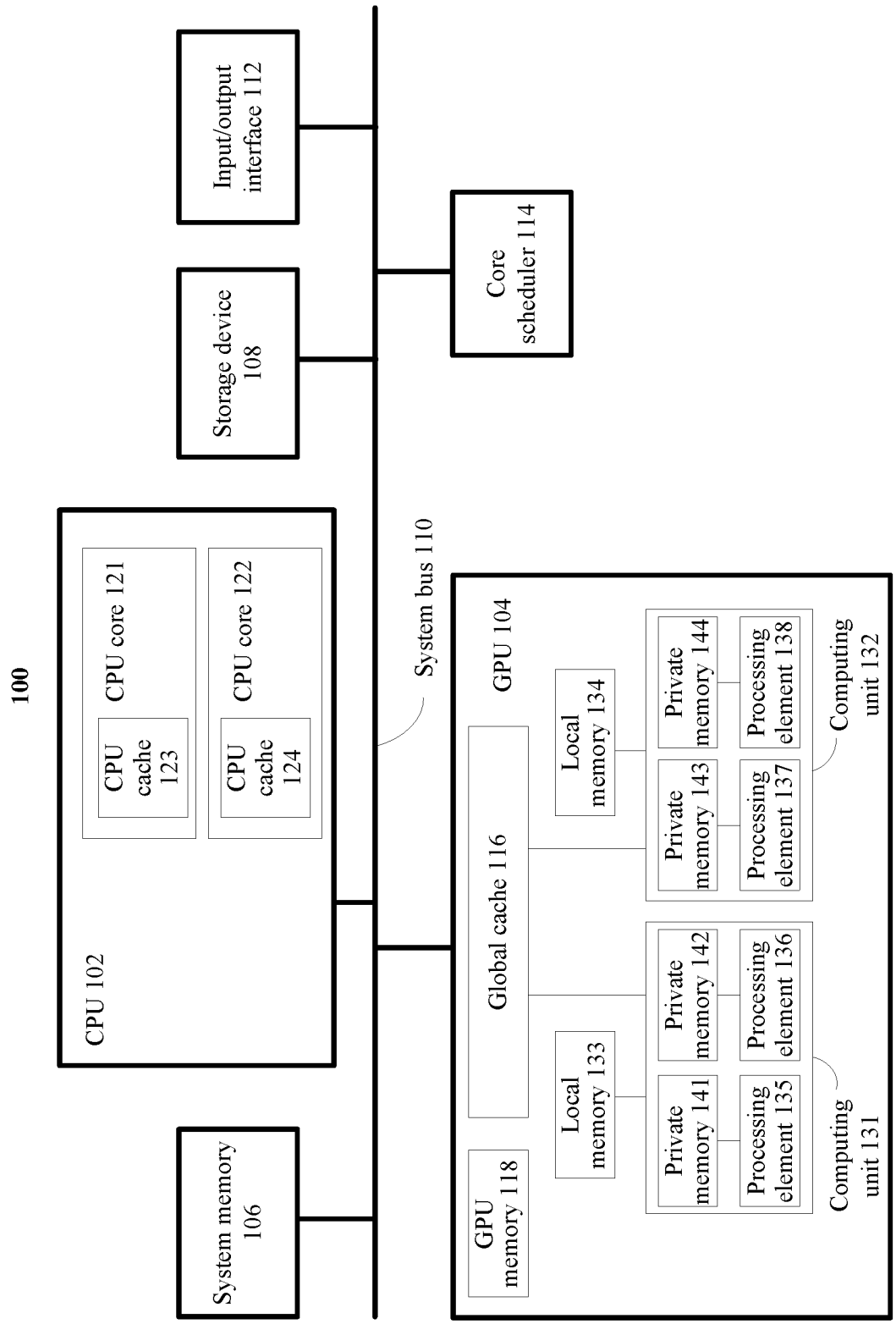
FIG. 1 is a schematic diagram of a logical structure of a heterogeneous computing system.

FIG. 1 is a schematic diagram of a logical structure of a heterogeneous computing system 100. The heterogeneous computing system 100 may include one or more central processing units (CPUs) such as a CPU 102, and one or more GPUs such as a GPU 104. The heterogeneous computing system 100 may further include a system memory 106, a storage device 108, a system bus 110, an input/output interface 112, and a core scheduler 114.

The CPU 102 may execute a control logic that controls operation of the entire heterogeneous computing system. The CPU 102 may be a multi-core CPU, for example, a dual-core CPU that includes CPU cores 121 and 122. In addition to a control circuit, the CPU 102 may further include a CPU cache, for example, caches 123 and 124 of the CPU cores 121 and 122, respectively. The CPU caches 123 and 124 may be configured to temporarily store an instruction and/or a parameter value when the CPU cores 121 and 122 run an application program, respectively. For example, the CPU cache 123 may be configured to temporarily cache one or more control logic instructions, variable values or constant values when the CPU core 121 executes a control logic instruction. Persons skilled in the art should understand that, in specific implementation, the CPU 102 may include more or fewer components and this is not limited in this embodiment of the present invention.

The GPU 104 may be configured to execute a specific instruction, and the GPU 104 may be configured to execute a graphics instruction, for example, graphics pipeline calculation such as geometric calculation and rendering. Generally, the GPU 104 is configured to execute instructions that can be executed in parallel.

The GPU 104 may include a GPU global cache 116 and one or more computing units 131 and 132. The GPU 104 may further include or couple one GPU memory 118. Each computing unit may have a local memory, such as local memories 133 and 134 of the computing units 131 and 132, respectively. Each computing unit includes one or more processing elements (processing element, PE). For example, the computing unit 131 includes processing elements 135 and 136, and the computing unit 132 includes processing elements 137 and 138. The processing elements 135, 136, 137, and 138 may each have a register and/or have private memories (private memory, PM) 141, 142, 143, and 144, respectively. Each GPU processing element may include one or more scalar and vector floating-point calculation units. The GPU global cache 116 may be coupled to the system memory 106 and/or the GPU memory 118.

The system memory 106 may include a dynamic random access memory (dynamic random access memory, DRAM). The system memory 106 may be configured to store a processing logic instruction, a constant value or a variable value when the system 100 runs an application program. For example, when the CPU executes the core scheduler 114, a control logic and/or another processing logic of the core scheduler 114 may be stored in the system memory 106. The processing logic is a control flow instruction, a calculation instruction, a resource access instruction, or the like.

The storage device 108 may be a non-volatile storage medium, for example, may be a magnetic disk, a solid state disk, or the like. The storage device 108 may be configured to store data and instructions. For example, an operating system and other application software are loaded from the storage device 108 into the system memory 106 when the system 100 is booted.

The system bus 110 may include a conventional data bus, and may alternatively be a local area network (local area network, LAN)-like network. The system bus 110 may alternatively be an on-chip bus or another on-chip interconnection network. The system bus 110 is configured to connect or couple components of the system 100.

The input/output interface 112 is configured to receive data and information that are input, and to output data such as an operation result.

The GPU memory 118 is coupled to the system bus 110 and the GPU. The GPU memory 118 is configured to store data that is transferred from the system memory 106 to the GPU for processing.

The core scheduler 114 is configured to schedule an instruction between different types of processors in the system 100. A program scheduled by the core scheduler 114 may be executed by one or more different types of processors. For some programs, a same instruction may be executed on different types of processors. The core scheduler 114 may be implemented by using software, firmware, hardware, or any combination thereof. When implemented by using the software, the core scheduler 114 may be a computer program stored in the system memory 106.

Meanwhile, persons skilled in the art should understand that, depending on a specific requirement, the system 100 may further include hardware components for implementing other additional functions. In addition, persons skilled in the art should understand that the system 100 may alternatively include only components required for implementing an embodiment of the present invention, but not necessarily include all components shown in FIG. 1.

A hardware structure shown in FIG. 1 and the foregoing descriptions are applicable to various apparatuses for detecting inter-instruction data dependency according to the embodiments of the present invention, and applicable to execution of various methods for detecting inter-instruction data dependency according to the embodiments of the present invention.

FIG. 2 is a schematic flowchart of a method for detecting inter-instruction data dependency according to an embodiment of the present invention. A set of to-be-detected instructions includes at least two instructions that need to be cyclically executed for N times. N detection threads of a processor perform parallel detection on each instruction. Thread numbers of the N detection threads are sequentially increased. An $i^{th}$ detection thread is used to detect an $i^{th}$ round of cyclical execution of each instruction, and the N detection threads sequentially perform detection on the at least two instructions according to an instruction sequence. N is a positive integer greater than 1, and i is a positive integer greater than 0 and less than or equal to N. As shown in FIG. 2, the method includes the following operations.

Operation S202: When a detection thread performs an access operation on a variable, a processor detects whether there is a historical access operation on the variable, and if there is no historical access operation on the variable, records a thread number corresponding to the current access operation.

It should be understood that a detection procedure in an embodiment of the present invention may be executed on a CPU or may be executed on a GPU. Because parallel detection is involved, being executed by the GPU brings better beneficial effects. However, this is not limited in embodiments of the present invention. The processor may be a CPU or a GPU.

The variable is a variable that can be shared by a plurality of detection threads. When the variable is accessed by a detection thread for a first time, a number and an access type of the thread that accesses the variable for the first time are recorded, where the access type includes a read operation and a write operation.

The processor separately records a historical read access operation and a historical write access operation. Specifically, a thread number corresponding to the historical write access operation on the variable and a thread number corresponding to the historical read access operation on the variable may be separately recorded by using one storage space.

Operation S204: When there is a historical access operation on the variable, if an access type of the current access operation is a write operation, the processor compares a thread number corresponding to the historical access operation with the thread number corresponding to the current access operation, and if the thread number corresponding to the current access operation is less than the thread number corresponding to the historical access operation, which indicates existence of data dependency for a to-be-detected instruction, terminates a detection; and if the access type of the current access operation is a read operation and the historical access operation includes a historical write access operation, compares a thread number corresponding to the historical write access operation with the thread number corresponding to the current access operation, and if the thread number corresponding to the current access operation is less than the thread number corresponding to the historical write access operation, which indicates existence of data dependency for the to-be-detected instruction, terminates the detection.

It should be understood that, in an embodiment of the present invention, the thread number corresponding to the detection thread is corresponding to a quantity of rounds of cyclical execution of the to-be-detected instruction. For example, a $1^{st}$ detection thread is corresponding to a $1^{st}$ round of cyclical execution, and an $N^{th}$ detection thread is corresponding to an $N^{th}$ round of cyclical execution. The N detection threads perform detection on a specific to-be-detected instruction in parallel, and the $i^{th}$ detection thread is used to perform detection on the $i^{th}$ round of cyclical execution of the to-be-detected instruction.

In an embodiment of the present invention, the thread number is actually used to represent a quantity of cyclical rounds corresponding to a detection instruction. For ease of description, the thread numbers are sequentially numbered based on a corresponding quantity of cyclical rounds. However, it should be understood that a specific implementation form of the thread number is not limited in this embodiment of the present invention. For example, the N detection threads may be numbered sequentially from 1 to N, or may be numbered in another incrementing form, for example, may be implemented by using incrementing thread IDs. In an embodiment of the present invention, the detection threads may even be numbered in a decrementing form. It is acceptable as long as a correspondence between the thread numbers and the quantity of cyclical rounds is established. When values of the thread numbers are compared subsequently, the quantities of cyclical rounds corresponding to the threads are actually compared.

Specifically, the processor sequentially performs detection on the instructions that need to be cyclically executed for N times according to an instruction sequence. In each round of detection, the N detection threads perform parallel detection on N rounds of cyclical execution of one instruction, and the $i^{th}$ detection thread performs detection on the $i^{th}$ round of cyclical execution of the instruction.

When the current access operation is a write operation, if the thread number corresponding to the current access operation is less than that of the historical write access operation, it indicates that in a normal execution logic, the write operation of the current access operation should be performed first and then the write operation of the historical write access operation is performed; however, this logical sequence is violated in a parallel detection procedure and there is violation of data dependency. It indicates that the to-be-detected instruction set has data dependency and cannot be executed by the GPU in parallel. In this case, the detection is terminated and the to-be-detected instruction set needs to be executed by the CPU. Likewise, if the thread number corresponding to the current access operation is less than that of the historical read access operation, it indicates that in the normal execution logic, the write operation of the current access operation should be performed first, and then a read operation of the historical read access operation is performed; however, this logical sequence is violated in the parallel detection procedure and there is a violation of data dependency. It indicates that the to-be-detected instruction set has data dependency and cannot be executed by the GPU in parallel. In this case, the detection is terminated and the to-be-detected instruction set needs to be executed by the CPU.

When the current access operation is a read operation, only the current access operation and the historical write access operation need to be compared because there is no data dependency between read operations. If the thread number corresponding to the current access operation is less than that of the historical write access operation, it indicates that in a normal execution logic, the read operation of the access operation should be performed first, and then the write operation of the historical write access operation is performed; however, this logical sequence is violated in the parallel detection procedure and there is a violation of data dependency. It indicates that the to-be-detected instruction set has data dependency and cannot be executed by the GPU in parallel. In this case, the detection is terminated and the to-be-detected instruction set needs to be executed by the CPU.

In an embodiment of the present invention, the historical read access operation and the historical write access operation are separately recorded. If the current access operation is a write operation, to ensure correctness of an execution result, it needs to ensure that the thread number corresponding to the current access operation is not less than thread numbers of all historical write access operations and historical read access operations. If the current access operation is a read operation, because there is no data dependency between read operations, to ensure correctness of the execution result, it merely needs to ensure that the thread number corresponding to the current access operation is not less than that of the historical write access operation. Therefore, during recording, only a historical write access operation with the largest thread number and a historical read access operation that has the largest thread number and whose thread number is greater than that of the historical write access operation with the largest thread number need to be recorded.

In this case, if the access type of the current access operation is a write operation, when the thread number corresponding to the current access operation is greater than the thread number corresponding to the historical write access operation or the historical access operation includes no historical write access operation, the thread number corresponding to the access operation is recorded. In addition, to save the amount of storage space, when the thread number corresponding to the current access operation needs to be recorded, if the historical access operation includes the historical write access operation, the thread number corresponding to the historical write access operation is deleted.

In another embodiment, if the thread number corresponding to the current access operation is not less than the thread number corresponding to the historical access operation, the thread number corresponding to the current access operation is recorded. The thread number corresponding to the current access operation is not less than the thread number corresponding to the historical access operation, and it indicates that the thread number corresponding to the current access operation is greater than or equal to the thread number corresponding to the historical write access operation. Therefore, the thread number corresponding to the current access operation can be directly recorded. This can omit a determining operation, but may add a recording operation when the thread number corresponding to the current access operation is equal to the thread number corresponding to the historical write access operation.

If the access type of the current access operation is a read operation, when the thread number corresponding to the access operation is greater than thread numbers of all historical access operations, the thread number corresponding to the current access operation is recorded. In addition, to save the storage space, when the thread number corresponding to the current access operation needs to be recorded, if the historical access operation includes the historical read access operation, the thread number corresponding to the historical read access operation is deleted.

In another embodiment of the present invention, if the access type of the current access operation is a read operation, determine whether the thread number corresponding to the current access operation is greater than the thread number corresponding to the historical read access operation, and if the thread number corresponding to the current access operation is greater than the thread number corresponding to the historical read access operation, the thread number corresponding to the current access operation is recorded.

Specifically, the historical access operation includes the historical write access operation and the historical read access operation. The system separately records the historical write access operation and the historical read access operation on the variable. The thread number corresponding to the historical write access operation on the variable and the thread number corresponding to the historical read access operation on the variable may be separately recorded by using one storage space. For ease of description, a storage space used for recording the thread number corresponding to the historical read access operation on the variable is denoted as an R space, and a storage space used for recording the thread number corresponding to the historical write access operation on the variable is denoted as a W space. If there is no historical read access operation on the variable, the R space is a specific identifier. If there is no historical write access operation on the variable, the W space is a specific identifier. For ease of description, a specific identifier 0 is used as an example for description in this embodiment of the present invention. It should be understood that a form of the specific identifier is not limited in this embodiment of the present invention.

Recording the thread number corresponding to the current access operation may be specifically as: if the current access operation is a write operation, recording the thread number corresponding to the current access operation in the W space; and if the current access operation is a read operation, recording the thread number corresponding to the current access operation in the R space. More specifically, only the largest thread number corresponding to the write operation and that of the read operation need to be recorded separately. To save the storage space, recording the thread number corresponding to the current access operation each time is performing an update operation in the W space and the R space.

Specifically, the N detection threads that perform detection on the to-be-detected instruction set belong to a same group, and are corresponding to threads of a same warp in the GPU. During a detection process, a plurality of groups of detection threads may simultaneously perform detection on different instructions. If it is detected that detection threads belonging to different groups perform an access operation including a write operation on a same variable, it indicates existence of inter-warp data dependency, and the detection is terminated. In an actual execution process, a thread execution sequence between different warps of the GPU is uncertain. Therefore, a set of to-be-detected instructions with inter-warp data dependency cannot be executed on the GPU, either.

During a detection process of a specific instruction, because N detection threads perform parallel detection on N rounds of cyclical execution of the same instruction, if there are two detection threads that perform an access operation including a write operation on a same variable, it indicates existence of data dependency and the detection is terminated. Because an actual execution sequence for threads in a same warp is random in the actual execution process, if two operations including a write operation are performed on the same variable in the N rounds of cyclical execution of the same instruction, the to-be-detected instruction set cannot be executed on the GPU.

According to the technical solution disclosed in an embodiment of the present invention, the access operation on the variable is monitored and whether there is data dependency between instructions of a set of to-be-detected instructions can be detected. A detection procedure in the embodiments of the present invention simulates an actual execution procedure of parallel execution of the to-be-detected instruction set, and therefore affine data dependency and non-affine data dependency can be detected. In this way, an instruction set without data dependency is identified to a greatest extent, and a determined instruction set without data dependency is executed in parallel on a GPU, so as to accelerate execution of the instruction set and improve overall performance of a system.

Figure 3A:
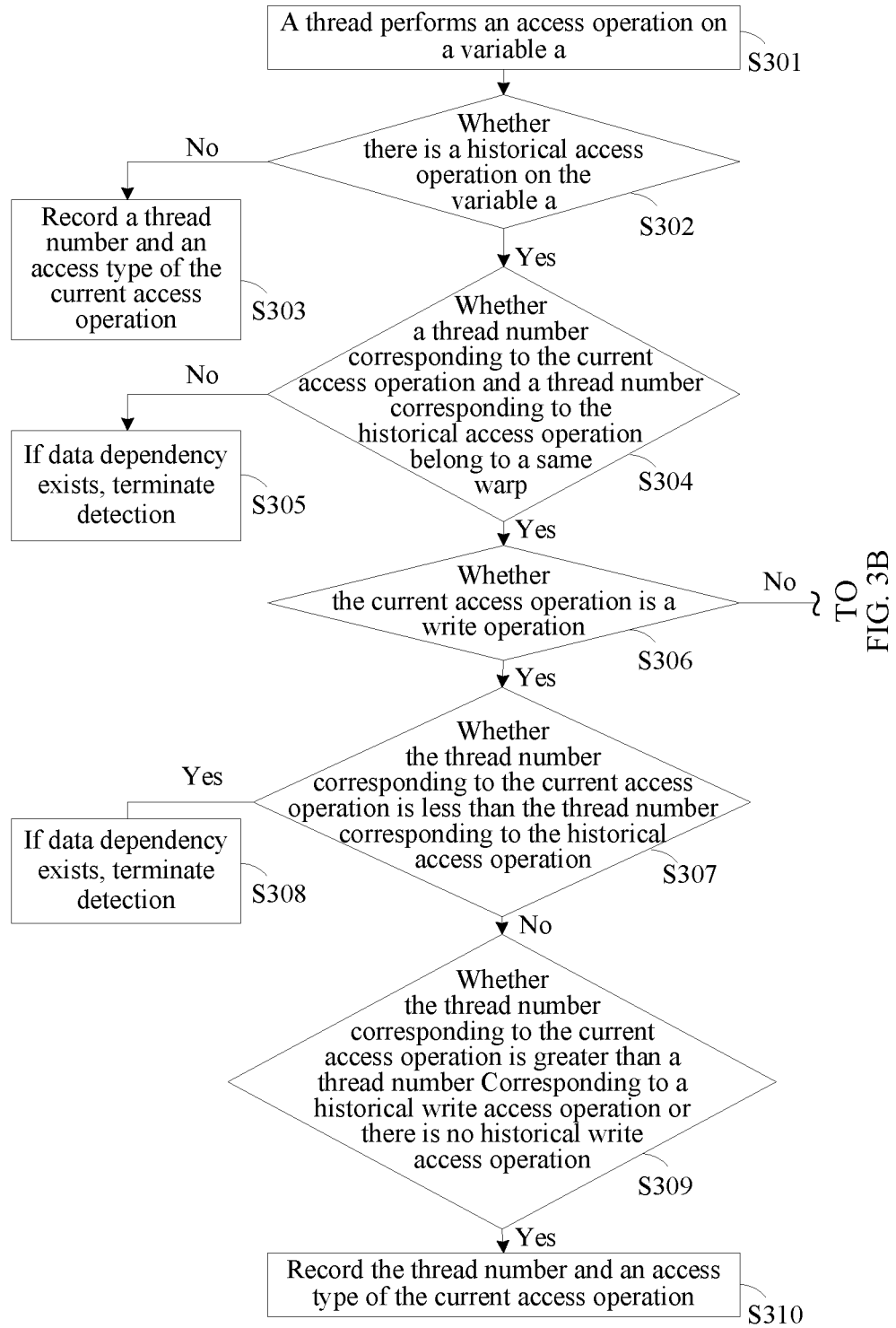
FIG. 3A and FIG. 3B are an exemplary flowchart of a method for detecting inter-instruction data dependency according to an embodiment of the present invention.
Figure 3B:
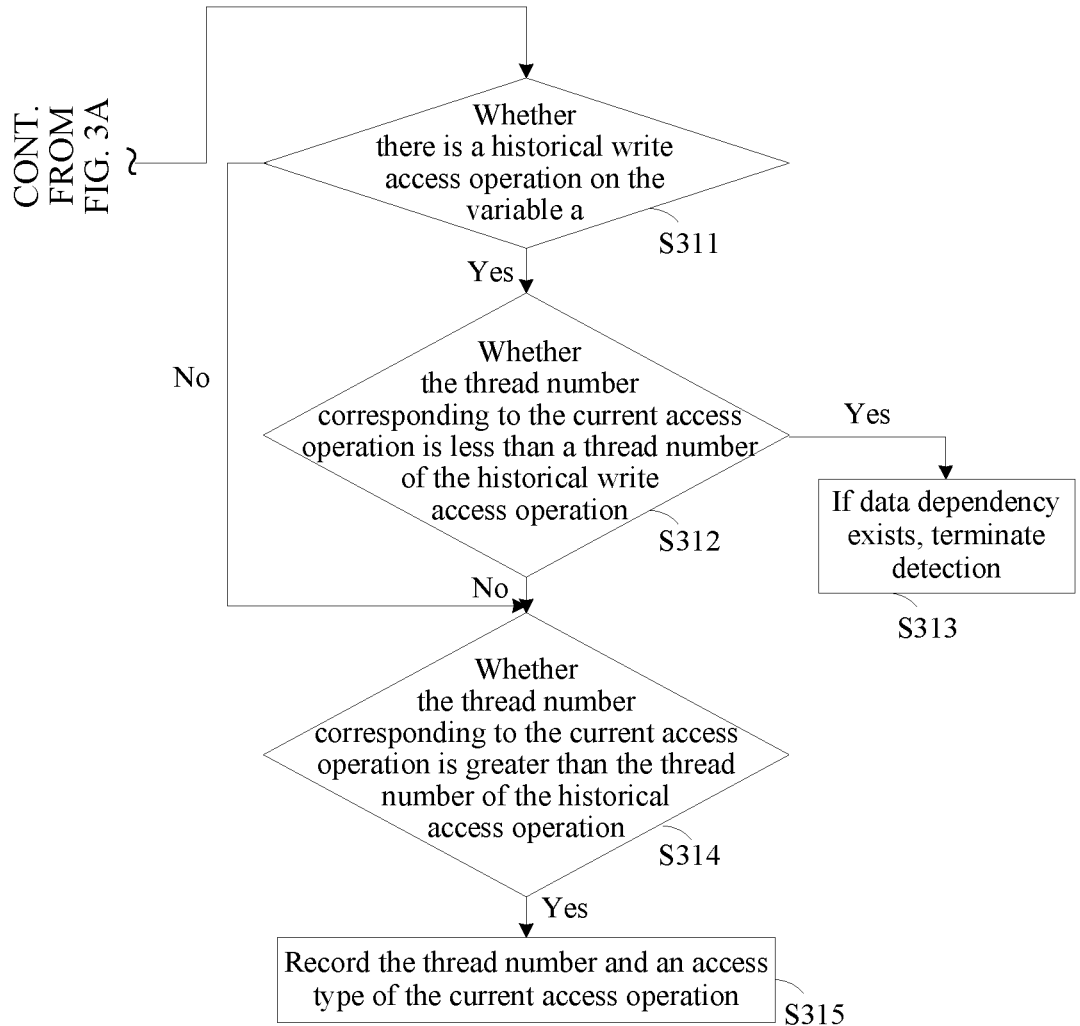

In one embodiment, the N threads in the same warp of the GPU may be used to perform detections on the to-be-detected instruction set. A specific detection procedure is shown in FIG. 3A and FIG. 3B. For ease of description, FIG. 3A and FIG. 3B describe a detection procedure of only one instruction in a set of to-be-detected instructions. After the detection on the instruction is completed, the detection is performed on a next instruction by using a same procedure.

Operation S301: One of N threads performs an access operation on a variable X.

Operation S302: Detect whether there is a historical access operation on the variable X, if there is no historical access operation on the variable X, perform operation S303, and if there is a historical access operation on the variable X, perform operation S304.

The historical access operation includes a historical write access operation and a historical read access operation. The system separately records the historical write access operation on the variable X and the historical read access operation on the variable a. Specifically, a thread number corresponding to the historical write access operation on the variable X and a thread number corresponding to the historical read access operation on the variable X may be separately recorded by using one storage space. For ease of description, in the following description, a storage space used for recording the thread number corresponding to the historical read access operation on the variable X is denoted as an R space, and a storage space used for recording the thread number corresponding to the historical write access operation on the variable X is denoted as a W space. If there is no historical read access operation on the variable X, the R space is a specific identifier. If there is no historical write access operation on the variable X, the W space is a specific identifier. For ease of description, a specific identifier 0 is used as an example for description in this embodiment of the present invention. It should be understood that a form of the specific identifier is not limited in this embodiment of the present invention.

Specifically, a detection is performed on the R space and the W space. If both the R space and the W space are 0, it indicates that there is no historical access operation on the variable X.

Operation S303: Record a thread number and an access type of the current access operation.

In one embodiment, if the current access operation is a read access, the thread number corresponding to the current access operation is recorded in the R space. If the current access operation is a write access, the thread number corresponding to the current access operation is recorded in the W space.

Operation S304: Determine whether a thread number corresponding to the current access operation and a thread number corresponding to the historical access operation belong to a same warp, if the thread number corresponding to the current access operation and the thread number corresponding to the historical access operation do not belong to the same warp, perform operation S305, and if the thread number corresponding to the current access operation and the thread number corresponding to the historical access operation belong to the same warp, perform operation S306.

Operation S305: If the thread number corresponding to the current access operation and the thread number corresponding to the historical access operation do not belong to the same warp, which indicates existence of data dependency, terminate detection.

In an embodiment of the present invention, the N threads in the same warp are used to perform a detection on the to-be-detected instruction set. Because an execution sequence of threads between different warps is random, if the threads of different warps perform an access operation on a same variable, it indicates existence of data dependency between the to-be-detected instruction set and another instruction set, and the detection is terminated. The to-be-detected instruction set needs to be executed by the CPU.

Operation S306: Determine whether the current access operation is a write operation, if the current access operation is a write operation, perform operation S307, and if the current access operation is a read operation, perform operation S311.

Operation S307: If the current access operation is a write operation, determine whether the thread number corresponding to the current access operation is less than the thread number corresponding to the historical access operation, and if the thread number corresponding to the current access operation is less than the thread number corresponding to the historical access operation, perform operation S308; otherwise, perform operation S309.

The N threads of the same warp sequentially perform detection on the instructions of the to-be-detected instruction set according to an instruction sequence. During each round of detection, the N threads perform detection on N rounds of cyclical execution of a same instruction in parallel. When the current access operation is a write operation, if a thread number recorded in the R space is greater than the thread number corresponding to the current access operation, it indicates that a quantity of cyclical rounds for a current read operation should be less than a recorded quantity of cyclical rounds for the historical read access operation. However, if a parallel execution method is used, a case of first reading the variable X and then writing the variable X occurs. In this case, a result of parallel execution is different from that of sequential execution, there is data dependency in the to-be-detected instruction set, and the detection is terminated.

Likewise, when the current access operation is a write operation, if a thread number recorded in the W space is greater than the thread number corresponding to the current access operation, it indicates that a quantity of cyclical rounds for a current write operation should be less than a recorded quantity of cyclical rounds for the historical write access operation. However, if the parallel execution method is used, two write operations are performed on the variable X, and this violates an original logical sequence. In this case, a result of parallel execution is different from that of sequential execution, there is data dependency in the to-be-detected instruction set, and the detection is terminated.

Operation S308: If the thread number corresponding to the current access operation is less than the thread number corresponding to the historical access operation, which indicates existence of data dependency, terminate the detection.

Operation S309: Determine whether there is a historical write access operation and whether the thread number corresponding to the current access operation is greater than a thread number corresponding to the historical write access operation, and if there is no historical write access operation or the thread number corresponding to the current access operation is greater than the thread number corresponding to the historical write access operation, perform operation S310.

Because the thread number represents a quantity of rounds of cyclical execution of an instruction and an $i^{th}$ thread performs detection on an $i^{th}$ round of cyclical execution of the instruction, to ensure a logical sequence for the variable a, it needs to ensure that a thread number corresponding to a subsequent operation on the variable X is not less than the largest thread number corresponding to previous write operations on the variable a. Therefore, in a specific procedure, only a thread number corresponding to a write access operation with the largest thread number needs to be recorded.

Therefore, only when there is no historical write access operation or the thread number corresponding to the current access operation is greater than the thread number corresponding to the historical write access operation, the thread number corresponding to the current access operation is recorded in the W space.

Operation S310: Record the thread number and an access type of the current access operation.

Specifically, if there is no historical write access operation, and a data bit 0 is recorded in the W space, the thread number corresponding to the current access operation is written into the W space. If there is a historical write access operation, and a thread number corresponding to the historical write access operation is recorded in the W space, the thread number corresponding to the current access operation is written into the W space, to update data recorded in the W space.

In another embodiment of the present invention, operation S309 may be omitted and operation S310 is directly performed. In other words, if the thread number corresponding to the current access operation is less than the thread number corresponding to the historical access operation in operation S307, operation S308 is performed; otherwise, operation S310 is performed.

The thread number corresponding to the current access operation is not less than the thread number corresponding to the historical access operation, and it indicates that the thread number corresponding to the current access operation is greater than or equal to the thread number corresponding to the historical write access operation. Therefore, the W space may be directly updated. This can omit a determining operation of operation S309, but may add an update operation in the W space when the thread number corresponding to the current access operation is equal to the thread number corresponding to the historical write access operation.

Operation S311: Determine whether there is a historical write access operation on the variable a, and if there is a historical write access operation on the variable a, perform operation S312; otherwise, perform operation S314.

A current access request is a write operation, because if there is no write operation on the variable X between two read access operations on the variable a, an original instruction execution logical sequence remains unchanged when a sequence of two read access requests change. There is no data dependency and therefore it merely needs to compare whether there is a logical conflict between the current access operation and the historical write access operation.

Operation S312: If there is a historical write access operation on the variable X, determine whether the thread number corresponding to the current access operation is less than a thread number corresponding to the historical write access operation, and if the thread number corresponding to the current access operation is less than the thread number corresponding to the historical write access operation, perform operation S313; otherwise, perform operation S314.

If there is a historical write access operation on the variable X, to ensure no logical conflict, when the execution is performed based on an original instruction sequence, it should also ensure that the historical write access operation is performed before the current access operation. To be specific, it needs to ensure that a quantity of cyclical rounds corresponding to the historical write access operation is not greater than a quantity of cyclical rounds for the current access operation. Because the thread number is corresponding to the quantity of cyclical rounds, it needs to ensure that the thread number corresponding to the historical write access operation is not greater than the thread number corresponding to the current access operation.

Operation S313: If the thread number corresponding to the current access operation is less than the thread number corresponding to the historical write access operation, which indicates existence of data dependency, terminate the detection.

If the thread number corresponding to the current access operation is less than the thread number corresponding to the historical write access operation, it indicates that the quantity of cyclical rounds for the current access operation is less than the quantity of cyclical rounds for the historical write access operation, and that the current access operation should be performed before the historical write access operation if execution is performed sequentially. In this case, a result of sequential execution is different from that of parallel execution, and there is a logical conflict. It indicates existence of inter-instruction data dependency, and the detection is terminated. The to-be-detected instruction set needs to be executed on the CPU.

Operation S314: Determine whether the thread number corresponding to the current access operation is greater than the thread number corresponding to the historical access operation, and if the thread number corresponding to the current access operation is greater than the thread number corresponding to the historical access operation, perform operation S315.

Because a read access request does not change a value of the variable, if the current access operation is a read operation, the thread number corresponding to the current access operation needs to be recorded only when the thread number corresponding to the current accessoperation is greater than those of all historical access operations.

Operation S315: Record the thread number and an access type of the current access operation.

Specifically, recording the thread number and the access type of the current access operation may be recording the thread number corresponding to the current access operation in the R space.

In another embodiment of the present invention, operation S314 may be replaced with the following: Determine whether the thread number corresponding to the current access operation is greater than the thread number corresponding to the historical read access operation, and if the thread number corresponding to the current access operation is greater than the thread number corresponding to the historical read access operation, perform operation S315.

Figure 4:
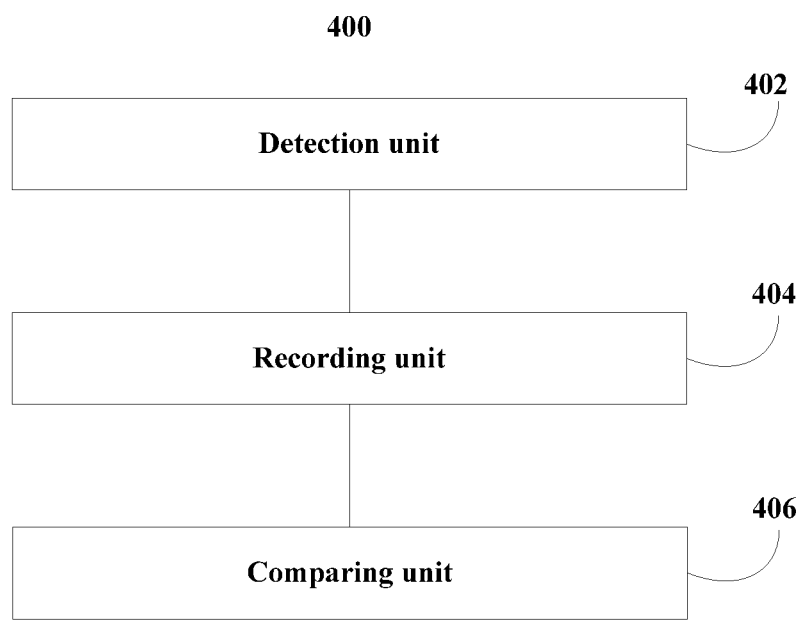
FIG. 4 is a schematic diagram of a logical structure of an apparatus for detecting inter-instruction data dependency according to an embodiment of the present invention.

FIG. 4 is a schematic diagram of an apparatus 400 for detecting inter-instruction data dependency according to an embodiment of the present invention. A set of to-be-detected instructions includes at least two instructions that need to be cyclically executed for N times. N detection threads of the apparatus 400 perform parallel detection on each instruction. Thread numbers of the N detection threads are sequentially increased. An $i^{th}$ detection thread is used to detect an $i^{th}$ round of cyclical execution of each instruction. The N detection threads sequentially perform detection on the at least two instructions according to an instruction sequence. N is a positive integer greater than 1, and i is a positive integer greater than 0 and less than or equal to N. The apparatus 400 includes:

a detection unit 402, configured to detect whether there is a historical access operation on the variable when a detection thread performs an access operation on a variable;

a recording unit 404, configured to record a thread number corresponding to the current access operation if there is no historical access operation on the variable; and a comparing unit 406, configured to: when there is a historical access operation on the variable, if an access type of the current access operation is a write operation, compare a thread number corresponding to the historical access operation with the thread number corresponding to the current access operation, and if the thread number corresponding to the current access operation is less than the thread number corresponding to the historical access operation, which indicates existence of data dependency for a to-be-detected instruction, terminate the detection; and configured to: if the access type of the current access operation is a read operation and the historical access operation includes a historical write access operation, compare a thread number corresponding to the historical write access operation with the thread number corresponding to the current access operation, and if the thread number corresponding to the current access operation is less than the thread number corresponding to the historical write access operation, which indicates existence of data dependency for the to-be-detected instruction, terminate the detection.

Specifically, if the access type of the current access operation is a write operation, when the thread number corresponding to the current access operation is greater than the thread number corresponding to the historical write access operation or the historical access operation including no historical write access operation, the recording unit 404 is configured to record the thread number corresponding to the current access operation.

In another embodiment, if the thread number corresponding to the current access operation is not less than the thread number corresponding to the historical access operation, the recording unit 404 is configured to record the thread number corresponding to the current access operation.

Figure 5:
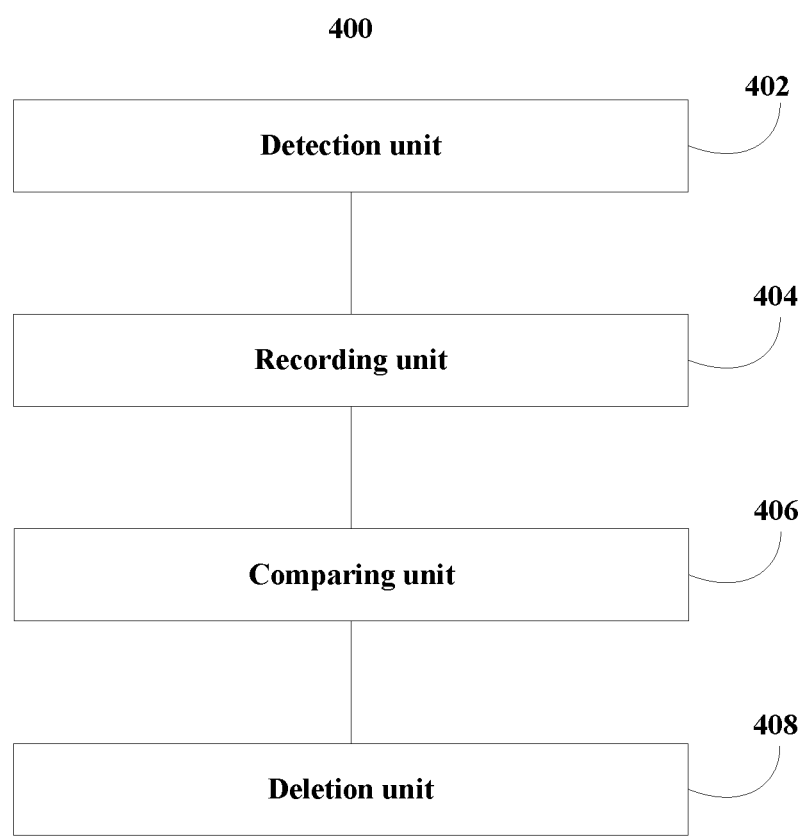
FIG. 5 is a schematic diagram of a logical structure of an apparatus for detecting inter-instruction data dependency according to an embodiment of the present invention.

In one embodiment, as shown in FIG. 5, the apparatus 400 further includes a deletion unit 408. If the access type of the current access operation is a write operation, and if the historical access operation includes a historical write access operation when the recording unit 404 records the thread number corresponding to the current access operation, the deletion unit 408 is configured to delete the thread number corresponding to the historical write access operation.

Specifically, if the access type of the current access operation is a read operation, when the thread number corresponding to the current access operation is greater than thread numbers of all historical access operations, the recording unit 404 is configured to record the thread number corresponding to the current access operation.

In one embodiment, as shown in FIG. 5, the apparatus 400 further includes the deletion unit 408. If the access type of the current access operation is a write operation, and if the historical access operation includes a historical read access operation when the recording unit 404 records the thread number corresponding to the current access operation, the deletion unit 408 is configured to delete a thread number corresponding to the historical read access operation.

It should be understood that function modules of the detection unit 402, the recording unit 404, the comparing unit 406, and the deletion unit 408 in this embodiment of the present invention may be integrated into a system memory 106 shown in FIG. 1, and different parts of the functional modules in the system memory 106 are executed by a CPU 102 or a GPU 104, to implement different functions. More specifically, the functional modules are stored in a storage device 108. When a system 100 runs, the CPU 102 or the GPU 104 loads the functional modules from the storage device 108 to the system memory 106. In specific implementation, the functional modules may be further refined, and this is not limited in this embodiment of the present invention.

An embodiment of the present invention includes an apparatus for detecting inter-instruction data dependency. Feature descriptions in the embodiments in FIG. 1 to FIG. 3A and FIG. 3B are applicable to this embodiment of the present invention, and details are not described herein again.

In the several embodiments provided in this application, it should be understood that the disclosed system, device, and method may be implemented in other manners. For example, the described apparatus embodiment is merely an example. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in an electrical form, a mechanical form, or another form.

The modules described as separate parts may or may not be physically separate, and parts displayed as modules may or may not be physical modules, that is, may be located in one position, or may be distributed on a plurality of network modules. Some or all of the modules may be selected according to actual needs to achieve the objectives of the solutions of the embodiments.

In addition, function modules in the embodiments of the present invention may be integrated into one processing module, or each of the modules may exist alone physically, or two or more modules may be integrated into one module. The integrated module may be implemented in a form of hardware, or may be implemented in a form of hardware in addition to a software function module.

When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) to perform some of the operations of the methods described in the embodiments of the present invention. The foregoing storage medium includes: any medium that can store program code, such as a removable hard disk, a read-only memory, a random access memory, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. A method for detecting inter-instruction data dependency, the method comprises:
    detecting whether there is a historical access operation on a variable when a detection thread of N detection threads performs an access operation on the variable, and recording a thread number corresponding to the access operation in response to a detection result that there is no historical access operation on the variable, wherein a set of to-be-detected instructions comprises at least two instructions that need to be cyclically executed for N rounds, the N detection threads running on a processor perform parallel detection on the N rounds of cyclical executions respectively, and the at least two instructions are sequentially detected according to an instruction sequence, the thread numbers from the $1^{st}$ detection thread to the $N^{th}$ detection thread are increased, and an $i^{th}$ detection thread is used to detect an $i^{th}$ round of cyclical execution, and wherein N is a positive integer greater than 1, and i is a positive integer greater than 0 and less than or equal to N; and
    when there is a historical access operation on the variable, if an access type of the access operation is a write operation, comparing a thread number corresponding to the historical access operation with the thread number corresponding to the access operation, and if the thread number corresponding to the access operation is less than the thread number corresponding to the historical access operation, indicating existence of data dependency for a to-be-detected instruction;
    and if the access type of the access operation is a read operation and the historical access operation comprises a historical write access operation, comparing a thread number corresponding to the historical write access operation with the thread number corresponding to the access operation, and if the thread number corresponding to the access operation is less than the thread number corresponding to the historical write access operation, indicating the existence of data dependency for a to-be-detected instruction.

2. The method according to claim 1, further comprising:
    recording the thread number corresponding to the access operation in response to a detection result that the access type of the access operation is a write operation when the thread number corresponding to the access operation is greater than the thread number corresponding to the historical write access operation or the historical access operation comprises no historical write access operation.

3. The method according to claim 2, further comprising:
    deleting the thread number corresponding to the historical write access operation in response to a detection result that the historical access operation comprises the historical write access operation when the thread number corresponding to the access operation needs to be recorded.

4. The method according to claim 1, further comprising:
    recording the thread number corresponding to the access operation in response to a detection result that the access type of the access operation is a read operation, when the thread number of the access operation is greater than the thread number corresponding to the historical access operation.

5. The method according to claim 4, further comprising:
deleting a thread number corresponding to the historical read access operation in response to a detection result that the historical access operation comprises a historical read access operation when the thread number corresponding to the access operation needs to be recorded.

6. An apparatus for detecting inter-instruction data dependency, wherein the apparatus comprises:
a processor wherein N detection threads are running on the processor;
a memory configured to store a set of to-be-detected instructions and an execution instruction;
wherein the set of to-be-detected instructions comprises at least two instructions that need to be cyclically executed for N rounds, the N detection threads perform parallel detection on the N rounds of cyclical executions respectively, and the at least two instructions are sequentially detected according to an instruction sequence, thread numbers from the $1^{st}$ detection thread to the $N^{th}$ detection thread are increased, an $i^{th}$ detection thread is used to detect an $i^{th}$ round of cyclical execution, wherein N is a positive integer greater than 1, and i is a positive integer greater than 0 and less than or equal to N;
wherein when the apparatus runs, the processor executes the execution instruction stored in the memory to perform:
detecting whether there is a historical access operation on a variable when a detection thread of the N detections performs an access operation on a variable, and recording a thread number corresponding to the access operation in response to a detection result that there is no historical access operation on the variable; and
when there is a historical access operation on the variable, if an access type of the access operation is a write operation, comparing a thread number corresponding to the historical access operation with the thread number corresponding to the access operation, and if the thread number corresponding to the access operation is less than the thread number corresponding to the historical access operation, indicating existence of data dependency for a to-be-detected instruction;
and if the access type of the access operation is a read operation and the historical access operation comprises a historical write access operation, comparing a thread number corresponding to the historical write access operation with the thread number corresponding to the access operation, and if the thread number corresponding to the access operation is less than the thread number corresponding to the historical write access operation, indicating the existence of data dependency for a to-be-detected instruction.

7. The apparatus according to claim 6, wherein the processor further executes the execution instruction stored in the memory to perform:
recording the thread number corresponding to the access operation in response to a detection result that the access type of the access operation is a write operation when the thread number corresponding to the access operation is greater than the thread number corresponding to the historical write access operation or the historical access operation comprises no historical write access operation.

8. The apparatus according to claim 7, wherein the processor further executes the execution instruction stored in the memory to perform:
deleting the thread number corresponding to the historical write access operation in response to a detection result that the historical access operation comprises the historical write access operation when the thread number corresponding to the access operation needs to be recorded.

9. The apparatus according to claim 6, wherein the processor further executes the execution instruction stored in the memory to perform:
recording the thread number corresponding to the access operation in response to a detection result that the access type of the access operation is a read operation, when the thread number of the access operation is greater than the thread number corresponding to the historical access operation.

10. The apparatus according to claim 9, wherein the processor further executes the execution instruction stored in the memory to perform:
deleting a thread number corresponding to the historical read access operation in response to a detection result that the historical access operation comprises a historical read access operation when the thread number corresponding to the access operation needs to be recorded.

11. A non-transitory readable medium comprising a set of to-be-detected instructions and an execution instruction, the execution instruction when executed by a processor, cause the processor to perform operations comprising:
detecting whether there is a historical access operation on a variable when a detection thread of the N detections performs an access operation on a variable, and recording a thread number corresponding to the access operation in response to a detection result that there is no historical access operation on the variable, wherein the set of to-be-detected instructions comprises at least two instructions that need to be cyclically executed for N rounds, the N detection threads running on the processor perform parallel detection on the N rounds of cyclical executions respectively, and the at least two instructions are sequentially detected according to an instruction sequence, the thread numbers from the $1^{st}$ detection thread to the $N^{th}$ detection thread are increased, and an $i^{th}$ detection thread is used to detect an $i^{th}$ round of cyclical execution, and wherein N is a positive integer greater than 1, and i is a positive integer greater than 0 and less than or equal to N; and
when there is a historical access operation on the variable, if an access type of the access operation is a write operation, comparing a thread number corresponding to the historical access operation with the thread number corresponding to the access operation, and if the thread number corresponding to the access operation is less than the thread number corresponding to the historical access operation, indicating existence of data dependency for a to-be-detected instruction;
and if the access type of the access operation is a read operation and the historical access operation comprises a historical write access operation, comparing a thread number corresponding to the historical write access operation with the thread number corresponding to the access operation, and if the thread number corresponding to the access operation is less than the thread number corresponding to the historical write access operation, indicating the existence of data dependency for a to-be-detected instruction.

12. The non-transitory readable medium according to claim 11, wherein the processor further executes the execution instruction to perform:
recording the thread number corresponding to the access operation in response to a detection result that the access type of the access operation is a write operation when the thread number corresponding to the access operation is greater than the thread number corresponding to the historical write access operation or the historical access operation comprises no historical write access operation.

13. The non-transitory readable medium according to claim 12, wherein the processor further executes the execution instruction to perform:
deleting the thread number corresponding to the historical write access operation in response to a detection result that the historical access operation comprises the historical write access operation when the thread number corresponding to the access operation needs to be recorded.

14. The non-transitory readable medium according to claim 11, wherein the processor further executes the execution instruction to perform:
recording the thread number corresponding to the access operation in response to a detection result that the access type of the access operation is a read operation, when the thread number of the access operation is greater than the thread number corresponding to the historical access operation.

15. The non-transitory readable medium according to claim 14, wherein the processor further executes the execution instruction to perform:
deleting a thread number corresponding to the historical read access operation in response to a detection result that the historical access operation comprises a historical read access operation when the thread number corresponding to the access operation needs to be recorded.

* * * * *